US010154629B2

(12) United States Patent  
Gao et al.

(10) Patent No.: US 10,154,629 B2  
(45) Date of Patent: Dec. 18, 2018

(54) PRESSURELESS IRRIGATION DEVICE

(71) Applicant: FARMLAND IRRIGATION RESEARCH INSTITUTE, CHINESE ACADEMY OF AGRICULTURAL SCIENCES, Xinxiang (CN)

(72) Inventors: Shengguo Gao, Xinxiang (CN); Renxiang Gao, Xinxiang (CN)

(73) Assignee: FARMLAND IRRIGATION RESEARCH INSTITUTE, CHINESE ACADEMY OF AGRICULTURAL SCIENCES, Xinxiang (CN)

( * ) Notice: Subject to any disclaimer, the term of this patent is extended or adjusted under 35 U.S.C. 154(b) by 0 days.

(21) Appl. No.: 15/876,108

(22) Filed: Jan. 19, 2018

(65) Prior Publication Data  
US 2018/0153111 A1 Jun. 7, 2018

Related U.S. Application Data

(63) Continuation of application No. PCT/CN2016/090630, filed on Jul. 20, 2016.

(30) Foreign Application Priority Data

Oct. 13, 2015 (CN) .......................... 2015 1 0655256  
Nov. 2, 2015 (CN) .......................... 2015 1 0725391  
Nov. 2, 2015 (CN) .......................... 2015 1 0725392

(51) Int. Cl.  
*A01G 25/16* (2006.01)  
*F16K 31/32* (2006.01)  
*A01G 25/06* (2006.01)

(52) U.S. Cl.  
CPC ........... *A01G 25/167* (2013.01); *A01G 25/06* (2013.01); *F16K 31/32* (2013.01); *Y10T 137/1866* (2015.04); *Y10T 137/7488* (2015.04)

(58) Field of Classification Search  
CPC ...... A01G 25/16; A01G 25/167; A01G 25/06; F16K 31/32; Y10T 137/1866; Y10T 137/189; Y10T 137/7439; Y10T 137/7488  
See application file for complete search history.

(56) References Cited

U.S. PATENT DOCUMENTS 3,127,108 A * 3/1964 Harris ................. A01G 25/167  
                                                                137/625  
3,174,496 A * 3/1965 Hoeppel .............. A01G 25/167  
                                                                137/78.2

(Continued)

FOREIGN PATENT DOCUMENTS

| CN | 37104234 A | 12/1988 |
|----|-----------|---------|
| CN | 1235760 A | 11/1999 |

(Continued)

*Primary Examiner* — Reinaldo Sanchez-Medina  
*Assistant Examiner* — David Colon Morales  
(74) *Attorney, Agent, or Firm* — Wayne & Ken, LLC; Tony Hom

(57) ABSTRACT

The present disclosure belongs to the technical field of farm irrigation, and particularly relates to a novel pressureless irrigation device. The novel pressureless irrigation device of the present disclosure uniformly conveys irrigation water to crop plant root systems on the basis of a "connector" principle; and the size of a flow cross-section necessarily satisfies the extremely-low flowing speed requirement of "lossless conveyance" for the "connector" in a static pressure dominant operating state, thereby eliminating a problem of irrigator blockage which accompanies energy dissipation. Water enters the atmosphere via transpiration of crop plants, and a water supply water level control pool at a head portion is triggered to replenish the water. The water consumption and water replenishment are adaptive, and human intervention and additional energy are not required, thereby realizing low-cost and "fool-proof" automatic irrigation and true sense of uniform irrigation.

8 Claims, 4 Drawing Sheets

Fig. 1

(56) References Cited

U.S. PATENT DOCUMENTS

| | | | | |
|---|---|---|---|---|
| 3,204,872 | A | * | 9/1965 | Whear .................. A01G 25/167 137/78.3 |
| 3,293,799 | A | * | 12/1966 | Keller .................. A01G 27/003 47/48.5 |
| 3,339,842 | A | * | 9/1967 | Hoeppel .............. A01G 25/167 137/78.2 |
| 3,898,843 | A | * | 8/1975 | Waterston ............ A01G 25/023 137/78.3 |
| 4,182,357 | A | * | 1/1980 | Ornstein .............. A01G 25/167 137/1 |
| 4,696,319 | A | * | 9/1987 | Gant .................... A01G 25/167 137/78.3 |
| 5,839,659 | A | * | 11/1998 | Murray ................. A01G 25/06 239/1 |
| 6,312,191 | B1 | * | 11/2001 | Rosenfeld ............ A01G 25/16 137/142 |
| 7,152,370 | B2 | * | 12/2006 | Caron ................... A01G 27/04 47/82 |
| 7,458,521 | B2 | * | 12/2008 | Ivans .................... A01G 25/16 137/78.3 |
| 7,506,658 | B2 | * | 3/2009 | Guest ................... F16K 31/001 137/78.2 |
| 7,900,396 | B2 | * | 3/2011 | Keren .................. A01G 27/003 47/48.5 |
| 7,921,865 | B2 | * | 4/2011 | Balet .................... A01G 25/167 137/78.3 |
| 8,132,739 | B2 | * | 3/2012 | Theort .................. A01G 9/245 239/13 |
| 8,371,325 | B1 | * | 2/2013 | Grizzle ................. F16K 31/12 137/78.3 |
| 2004/0244833 | A1 | * | 12/2004 | Buhler .................. A01G 25/167 137/78.2 |
| 2005/0204624 | A1 | * | 9/2005 | Lozano Teruel ..... A01G 25/023 47/81 |
| 2005/0279856 | A1 | * | 12/2005 | Nalbandian ........... A01G 25/02 239/76 |
| 2008/0098652 | A1 | * | 5/2008 | Weinbel ................ A01G 25/06 47/1.01 F |
| 2008/0127324 | A1 | | 5/2008 | Seo et al. |
| 2008/0302003 | A1 | | 12/2008 | Keren |
| 2011/0058900 | A1 | * | 3/2011 | Furukawa ............. A01G 25/06 405/43 |

FOREIGN PATENT DOCUMENTS

| | | |
|---|---|---|
| CN | 2542046 Y | 4/2003 |
| CN | 2623007 Y | 7/2004 |
| CN | 1520717 A | 8/2004 |
| CN | 1547886 A | 11/2004 |
| CN | 101623668 A | 1/2010 |
| CN | 201462154 U | 5/2010 |
| CN | 201718278 U | 1/2011 |
| CN | 102144524 A | 8/2011 |
| CN | 102160518 A | 8/2011 |
| CN | 103348898 A | 10/2013 |
| CN | 203523465 U | 4/2014 |
| CN | 103828690 A | 6/2014 |
| CN | 203661746 U | 6/2014 |
| CN | 103939661 A | 7/2014 |
| CN | 104488662 A | 4/2015 |
| CN | 104719095 A | 6/2015 |
| CN | 105191756 A | 12/2015 |
| CN | 105201047 A | 12/2015 |
| CN | 105221818 A | 1/2016 |
| CN | 205040360 U | 2/2016 |
| CN | 205205935 U | 5/2016 |
| CN | 205207865 U | 5/2016 |
| JP | 2000106770 | 4/2000 |
| JP | 2008237135 A | 10/2008 |
| JP | 2010236301 A | 10/2010 |
| JP | 2010255016 A | 11/2010 |

* cited by examiner

US 10,154,629 B2

PRESSURELESS IRRIGATION DEVICE

TECHNICAL FIELD

The present disclosure belongs to the technical field of farmland irrigation, and particularly relates to a novel pressureless irrigation device.

BACKGROUND

The concept of pressureless irrigation has been first proposed by an authorized patent "a novel pressureless irrigation device" with a publication number of CN102160518A. Pressureless irrigation is an irrigation method in which an elevation of an irrigation water source is equal to that of an irrigator, which is derived from a definition of "negative pressure irrigation". The patent CN102160518A is invented to provide a novel pressureless irrigation device which is as efficient as the negative pressure irrigation, more convenient to use, more durable and highly reliable. A patent literature with the publication number of CN102160518A discloses a novel pressureless irrigation device which includes a water supply tank, a water level control pool, a water conveying main pipe, a confluence pipe and a plurality of irrigators (referring to a patent specification of CN102160518A).

The patent of a novel pressureless irrigation device with the publication number of CN102160518A adopts the irrigator (referring to the patent specification of CN 102160518 A) using a U-shaped concrete trough as a basic structure, and has the following defects. Firstly, high-precision concrete pouring molding equipment is required in on-site construction; a series of technical problems exist such as expansion joint anti-seepage treatment and the like; input is large and construction is difficult. Secondly, the U-shaped concrete trough made of brittle material is easy to be damaged by frost-heaving, uneven subsidence, tillage machine operation and the like; most importantly, the height of a soil saturated water layer cannot be adjusted for supplying water to a crop root system layer by rising of soil capillary water. When water consumption for crop transpiration is not high, and when the soil water continues to rise to a soil surface to form soil evaporation between plants and to cause accumulation of salt in the surface soil, the problem cannot be solved by reducing the height of the soil saturated water layer. Similarly, a common problem of irregular seedling emergence caused by inadequate water supply of the surface soil at a seedling stage after underground irrigation sowing also cannot be solved by a method of raising the height of the soil saturated water layer. The patent of a novel pressureless irrigation device with the publication number of CN102160518A adopts a water supply tank type water level adjustment and water supply device which has the following defects. Firstly, a special control water level adjustment mechanism and control water level gauge are not provided so that the control water level is very difficult to be adjusted accurately, and requirement of accurately and conveniently adjusting the control water level at any time of a novel irrigator of the novel pressureless irrigation device of the present cannot be satisfied. Secondly, a water supply tank of the water supply tank type water level adjustment and water supply device needs to operate in a closed state (referring to the patent specification of CN 102160518 A), which cannot be filled with water at any time, and is inconvenient to adopt a photovoltaic water pumping mode.

SUMMARY

Aims of the present disclosure are to provide a novel pressureless irrigation device capable of overcoming the above defects, to eliminate a problem of irrigator blockage of a "traditional irrigation operation mode" in a brand-new irrigation operation mode, and to realize low-cost and "foolproof" automatic irrigation and true sense of uniform irrigation.

The aims of the present disclosure are achieved by follows.

The novel pressureless irrigation device includes a novel irrigator and a novel water supply system, which uniformly convey irrigation water to crop plant root systems, wherein the novel irrigator and a water supply water level control pool of the novel water supply system are based on a "connector" principle; and the size of a flow cross-section satisfies the extremely-low flowing speed requirement of "lossless conveyance" for the "connector" in a static pressure dominant operating state.

The novel pressureless irrigation device includes a novel irrigator for the novel pressureless irrigation device, wherein the novel irrigator includes an equal-diameter downstream tee joint, a horizontal water inlet end of the equal-diameter downstream tee joint, a horizontal water outlet end of the equal-diameter downstream tee joint, a vertical water inlet end of the equal-diameter downstream tee joint, a connecting pipe, a reducer pipe, a soil saturated water layer forming pipe, porous water-permeable plates, sandstone inverted filters and backfill soil. The equal-diameter downstream tee joint is connected to underground capillary pipes in series. The horizontal water inlet end of the equal-diameter downstream tee joint is connected with a head end direction of one capillary pipe. The horizontal water outlet end of the equal-diameter downstream tee joint is connected with a rear end direction of the capillary pipe. Head ends of all the capillary pipes are communicated with water supply water level control pool by water supply branch pipes and water supply main pipes. Rear ends of all the capillary pipes are connected with capillary pipe flushing valves by drainage branch pipes and drainage main pipes. The water supply branch pipes, the drainage branch pipes, the drainage main pipes and all the capillary pipes are located on a same horizontal plane. When noncapillary pipes perform flushing operation, the flushing valves are in a closed state. The vertical water inlet end of the equal-diameter downstream tee joint is connected with a small head of the reducer pipe by the connecting pipe. A lower end of the soil saturated water layer forming pipe is vertically inserted into a large head of the reducer pipe. The porous water-permeable plates are placed at the bottom of the soil saturated water layer forming pipe and on one side of the large head of a diameter reducing position of the reducer pipe. The sandstone inverted filters are placed on the porous water-permeable plates. The backfill soil is placed on the sandstone inverted filters. A distance between a top end of the soil saturated water layer forming pipe and a soil surface of an irrigated farmland is 40-45 cm. A height adjustment range of a soil saturated water layer is from the bottom of the backfill soil in the soil saturated water layer forming pipe to the top of the soil saturated water layer forming pipe. The height of the soil saturated water layer is adjusted by adjusting a water level of a corresponding water supply water level control pool.

The novel pressureless irrigation device further includes a floating ball water level control device having a control water level adjustment mechanism and a gauge, wherein water inlet pipes of the water supply water level control pool horizontally penetrate through side walls of the water supply water level control pool from the right to the left and enter the water supply water level control pool. Ports connected to an equal-diameter tee face the right. A lower end of an upper connecting pipe is connected with the upper port of the equal-diameter tee above ports perpendicular to an upper port and a lower port of the equal-diameter tee. An upper end of the upper connecting pipe is connected with the lower end of a female adapter. A square plug is mounted at the upper end of the female adapter. The upper end of a lower connecting pipe is connected with the lower port of the equal-diameter tee. The lower end of the lower connecting pipe is connected with the upper port of a ball valve. The lower port of the ball valve is connected with the upper end of a water distribution pipe. The water distribution pipe has a suspended lower end and a downward pipe port. A horizontal head-on surface of a valve rod of the ball valve is inward, and is perpendicular to a plane on which the upper connecting pipe, the lower connecting pipe and the water inlet pipes in the water supply water level control pool are located, and is perpendicular to the plane. A right upper shaft is fixed inwards at an upper portion of the upper connecting pipe. A right end of the upper connecting rod is sleeved on a right upper shaft after being drilled, and then is equipped with a circular gasket and a gasket fixing plug pin. The upper connecting rod can rotate about the shaft in the plane perpendicular to the shaft; the right end of the lower connecting rod is fixed to the valve rod. When a left end and a right end of the lower connecting rod are located on the same horizontal plane, the ball valve is in a closed state. When the left end of the lower connecting rod is separated from the horizontal plane and moves downwards, the valve rod can be driven to rotate to open the closed ball valve. A left lower shaft is fixed inwards parallel to the head-on surface of the valve rod at the lower end of a sleeve. The left end of the lower connecting rod is sleeved on the left lower shaft after being drilled and then is equipped with the circular gasket and the gasket fixing plug pin. A left upper shaft is fixed inwards and parallel to the right upper shaft on the sleeve at a position with a distance equal to a distance between the valve rod and the right upper shaft above the left lower shaft. The left end of the upper connecting rod is sleeved on the left upper shaft after being drilled and then is equipped with the circular gasket and the gasket fixing plug pin. The distance between the right upper shaft and the left upper shaft is equal to the distance between the valve rod and the left lower shaft. A pull ring is fixed at the upper end of a floating box connecting rod. Control level gauges are arranged on the upper portion of the floating box connecting rod and the floating box connecting rod below the pull ring. The lower end of the floating box connecting rod penetrating through the sleeve is fixed to a floating box by a fixing nut on the floating box. Control water level positioning pins are mounted on an upward extended section of the sleeve and on the sleeve at a height higher than an upper cover plate of the water supply water level control pool and convenient to operate above the left upper shaft. The upper connecting rod and the lower connecting rod move in the same plane perpendicular to the valve rod, the right upper shaft, the left lower shaft and the left upper shaft. The pipe port at one end of the water outlet pipe of each water supply water level control pool penetrates through the side wall of the water supply water level control pool, and is located at the bottom of the water supply water level control pool, and is 20-25 cm higher than a bottom surface of the water supply water level control pool. The other ends of the water outlet pipes of the water supply water level control pool are connected with the water supply main pipes in the novel irrigator for the novel pressureless irrigation device.

The novel pressureless irrigation device further includes a photovoltaic water supply system for the novel irrigator of the novel pressureless irrigation device. The photovoltaic water supply system includes a photovoltaic water pumping portion, a water reservoir and the water supply water level control pool. The photovoltaic water pumping portion is composed of a solar battery array, a photovoltaic water pumping invertor and a water pump. The solar battery array is placed on the water reservoir. The water pump is placed at the bottom in a water source well. A water pump water outlet pipe is mounted on a water outlet of the water pump. The pipe port at the other end of the water pump water outlet pipe is located above the water reservoir and is downward. An overflow pipe is arranged on an upper portion of the water reservoir. A water inlet pipe port of the overflow pipe is formed in a side wall of the water reservoir. The pipe port is located in the water reservoir and is 10-15 cm lower than an upper edge of the side wall of the water reservoir. The other end of the overflow pipe is located outside the water reservoir and has the water outlet pipe port placed in a water source well. One end of the water inlet pipe of each water supply water level control pool is connected with the water reservoir. The pipe port at the end penetrates through the side wall of the water reservoir, and is located in the water reservoir and is 15-20 cm higher than the bottom surface of the water reservoir. The other end of the water inlet pipe of each water supply water level control pool horizontally penetrates through the side wall of the water supply water level control pool from right to left and enters the water supply water level control pool. The ports are connected to an equal-diameter tee face the right. The lower end of the upper connecting pipe is connected with the upper port of the equal-diameter tee above the ports perpendicular to the upper port and the lower port of the equal-diameter tee. The upper end of the upper connecting pipe is connected with the lower end of the female adapter. The square plug is mounted at the upper end of the female adapter. The upper end of the lower connecting pipe is connected with the lower port of the equal-diameter tee. The lower end of the lower connecting pipe is connected with the upper port of the ball valve. The lower port of the ball valve is connected with the upper end of the water distribution pipe. The water distribution pipe has the suspended lower end and the downward pipe port. The horizontal head-on surface of the valve rod of the ball valve is inward, and is perpendicular to the plane on which the upper connecting pipe. The lower connecting pipe and the water inlet pipes in the water supply water level control pool are located, and is perpendicular to the plane. The right upper shaft is fixed inwards at the upper portion of the upper connecting pipe. The right end of the upper connecting rod is sleeved on the right upper shaft after being drilled, and then is equipped with the circular gasket and the gasket fixing plug pin. The upper connecting rod can rotate about the shaft in the plane perpendicular to the shaft. The right end of the lower connecting rod is fixed to the valve rod. When the left end and the right end of the lower connecting rod are located on the same horizontal plane, the ball valve is in the closed state. When the left end of the lower connecting rod is separated from the horizontal plane and moves downwards, the valve rod can be driven to rotate to open the closed ball valve. The left lower shaft is fixed inwards parallel to the head-on surface of the valve rod at the lower end of the sleeve. The left end of the lower connecting rod is sleeved on the left lower shaft after being drilled and then is equipped with the circular gasket and the gasket fixing plug pin. The left upper shaft is fixed inwards and parallel to the right upper shaft on the sleeve at a position with a distance equal to a distance between the valve rod and the right upper shaft above the left lower shaft. The left end of the upper connecting rod is sleeved on the left upper shaft after being drilled and then is equipped with the circular gasket and the gasket fixing plug pin. The distance between the right upper shaft and the left upper shaft is equal to the distance between the valve rod and the left lower shaft. The pull ring is fixed at the upper end of the floating box connecting rod. The control level gauges are arranged on the upper portion of the floating box connecting rod and the floating box connecting rod below the pull ring. The lower end of the floating box connecting rod penetrating through the sleeve is fixed to the floating box by the fixing nut on the floating box. The control water level positioning pins are mounted on the upward extended section of the sleeve and on the sleeve at the height higher than an upper cover plate of the water supply water level control pool and convenient to operate above the left upper shaft. The upper connecting rod and the lower connecting rod move in the same plane perpendicular to the valve rod, the right upper shaft, the left lower shaft and the left upper shaft. The pipe port at one end of the water outlet pipe of each water supply water level control pool penetrates through the side wall of the water supply water level control pool, is located in the water supply water level control pool, and is 20-25 cm higher than the bottom surface of the water supply water level control pool. The other ends of the water outlet pipes of the water supply water level control pool are connected with the water supply main pipes in the novel irrigator for the novel pressureless irrigation device.

Further, regarding to the novel pressureless irrigation device, one end of the water inlet pipe of each water supply water level control pool is connected with the water reservoir. The water reservoir can supply water in other modes besides the photovoltaic water pumping mode; or the water reservoir and the photovoltaic water pumping portion are replaced with other water sources with a minimum dynamic water level higher than that of the water supply water level control pool.

Further, regarding to the novel pressureless irrigation device, the novel irrigator and the novel water supply system uniformly convey the irrigation water to the crop plant root systems. The novel irrigator and the water supply water level control pool of the novel water supply system are based on the "connector" principle. The size of the flow cross-section satisfies the extremely-low flowing speed requirement of "lossless conveyance" for the "connector" in the static pressure dominant operating state.

Further, regarding to the novel pressureless irrigation device, the distance between the top end of the soil saturated water layer forming pipe and the soil surface of the irrigated farmland is 5-10 cm greater than a maximum tractor-ploughing depth of the irrigated farmland.

Further, regarding to the novel pressureless irrigation device, the height adjustment range of the soil saturated water layer is from the bottom of the backfill soil in the soil saturated water layer forming pipe to the top of the soil saturated water layer forming pipe and is 3-4 cm lower than the upper edge.

Further, regarding to the novel pressureless irrigation device, the height of the soil saturated water layer is controlled and adjusted by controlling and adjusting the water level of the corresponding water supply water level control pool based on the "connector" principle.

Further, regarding to the novel pressureless irrigation device, the porous water-permeable plates are sphere-shaped plates having convex surfaces placed upwards.

The present disclosure has the following technical features and positive effects.

For a long time, in order to uniformly convey the irrigation water to the crop plant root systems, an irrigation operation mode of dissipating energy is realized via the irrigator after pressurization, referred to as a "traditional irrigation operation mode" in the present description. Theoretically, in the "traditional irrigation operation mode", the irrigator blockage takes place along with energy dissipation of the irrigator. The energy dissipation of the irrigator provides conditions for the irrigator blockage. The irrigator blockage is difficult to be eliminated as long as the irrigator still can perform an energy dissipation function. Long-term scientific research and production practice also prove that elimination of the irrigator blockage under the "traditional irrigation operation mode" with a premise, such as an environment-friendly non-chemical method, which seems to be an impossible task, and deserves a name of worldwide problem.

The novel pressureless irrigation device of the present disclosure uniformly conveys the irrigation water to the crop plant root systems on the basis of the "connector" principle. The novel pressureless irrigation device of the present disclosure does not need to pressurize, and adopts "lossless conveyance", with a driving force from a capillary force of the soil and a water potential energy difference of the soil, the plants and the atmosphere which consume solar energy. It is a brand-new irrigation operation mode substantially different from the "traditional irrigation operation mode", and has a necessary and sufficient condition of the "lossless conveyance" in the static pressure dominant operating state based on the "connector" principle.

Because of soil capillary force as well as the water potential energy difference between the soil, the plants and the atmosphere, the water of the soil saturated water layer in the soil saturated water layer forming pipe rises to a crop plant system layer in a form of soil capillary water, and then is conveyed to the atmosphere via transpiration of the crop plant. The transpiration of the crop plant consumes the water of the soil saturated water layer in the soil saturated water layer forming pipe, so that the height of the soil saturated water layer in the soil saturated water layer forming pipe falls. On the basis of the "connector" principle, the water supply water level control pool at a head portion is triggered to replenish the water. The replenished water is as much as the water consumed by crops. The volume of replenished water is increased or reduced with water consumption adaptively without human intervention and additional energy, so that low-cost and "fool-proof" automatic irrigation and true sense of uniform irrigation are realized. For the "traditional irrigation operation mode", the irrigation quantity is set artificially. The soil is irrigated with the same volume of water without considering spatial difference of own water conditions of the soil. In fact, the volume of water may be appropriate for one portion of a field and may be excessive or insufficient to the other portion, thereby affecting the growth of the crops. In other words, in the "traditional irrigation operation mode", even if the volume of water flowing from each irrigator is identical, it is not uniform irrigation in true sense.

Following the "connector" principle, only when the size of the flow cross-section necessarily satisfies the extremely-low flowing speed requirement of "lossless conveyance" for the "connector" in the static pressure dominant operating state, the irrigation water can be uniformly conveyed to the crop plant root systems. Otherwise, the greater the distance from the water supply water level control pool at the head portion is, the lower the height of the soil saturated water layer in the soil saturated water layer forming pipe is. The purpose of uniformly conveying the irrigation water to the crop plant root systems cannot be achieved. The so-called "lossless conveyance" refers to "lossless conveyance" with relative significance when the height of the soil saturated water layer in the soil saturated water layer forming pipe at a maximum distance from the water supply water level control pool at the head portion falls due to conveyance loss, the water supply uniformity and costs are taken into account, and the maximum falling magnitude (appearing at a maximum replenished water flow corresponding to the maximum water consumption) is in an allowable range. The "lossless conveyance" can be realized only when an area of the flow cross-section is increased and an on-way resistance of conveyance is reduced in a manner of reducing the flow speed, i.e., the so-called the extremely-low flowing speed requirement of "lossless conveyance" for the "connector" in the static pressure dominant operating state. Certainly, the area of a soil pore channel is increased by increasing a pipe diameter of the soil saturated water layer forming pipe of the novel irrigator. The pipe diameter of the soil saturated water layer forming pipe must be greater than that of the capillary pipe at the same flow and flow speed. Because of "adaptive irrigation", the water is saved to the largest degree. The conveyed flow rate is far less than that in the "traditional irrigation operation mode". The investment of the area of the flow cross-section increased to satisfy the extremely-low flowing speed requirement of "lossless conveyance" for the "connector" in the static pressure dominant operating state of the "connector" is not great. Compared with the "traditional irrigation operation mode", the adaptive irrigation is cost-effective, economical and completely acceptable. Specific pipes and sizes used by the flow cross-section are shown in embodiments of the novel irrigator of the present disclosure. Certainly, when the extremely-low flowing speed requirement with "lossless conveyance" for the "connector" in the static pressure dominant operating state is satisfied, other combinations of the pipes and the sizes except embodiments of the novel irrigator of the present disclosure can also be adopted as required. For example, based on an actual situation that the on-way water flow rate of the capillary pipes is gradually reduced, the on-way reducing thick-to-fine capillary pipes are adopted to achieve the purpose of being more economical and enhancing the flushing effect of the capillary pipes (the capillary pipe flushing valves are opened). The extremely-low flowing speed greatly weakens the entrainment capability to solid particles in the irrigation water, and in combination with a precipitation effect of gravity, the solid particles in the irrigation water cannot be moved to the soil pore channel of the soil saturated water layer forming pipe located at a high altitude to form blockage, thereby eliminating a root cause of the irrigator blockage. Therefore, an excellent anti-blockage performance is realized without any filtering device. The solid particles precipitated in the capillary pipes located at a low altitude can be flushed out by opening the capillary pipe flushing valves. Because we irrigate non-aquatic crops, a situation that the crop root systems invade into the soil saturated water layer forming pipe does not appear. Even if invasion exists, the soil saturated water layer forming pipe with a large pipe diameter cannot be blocked, thereby eliminating the problem of irrigator blockage when the irrigator performs the energy dissipation function in the "traditional irrigation operation mode".

According to a fundamental law of fluid mechanics, the resistance (water head loss) is in direct proportion to the square of the flow speed. The flow speed is very low and almost no conveyance loss exists, so that the volume of supplied water is large and the water supply is sufficient, and thus the volume of an unsaturated wetting body in the soil formed under action of the capillary pipes of the soil is maximum and the irrigators can be laid under a tractor-ploughing layer slightly farther from the crop plant root systems, thereby overcoming major defects that the other "adaptive irrigation" method-"negative pressure irrigation" cannot satisfy water demands of the crops when the conveying resistance (stroke) of the soil is increased since the driving force is excessively consumed when resisting the conveying resistance of the "negative pressure irrigation" system, causing that the irrigators for the "negative pressure irrigation" cannot be laid under the tractor-ploughing layer slightly farther from the crop plant root systems, thereby affecting the tractor-ploughing operation and requiring frequently laying the underground irrigators and the capillary pipes for the "negative pressure irrigation".

The novel pressureless irrigation device of the present disclosure is sturdy and durable and can accurately adjust the control water level of the underground water supply water level control pool by the overground control water level gauge and positioning pin. The height of the soil saturated water layer for supplying water to the crop root system layer by raising the water in the soil capillary pipe can be controlled and adjusted conveniently and accurately since the "lossless conveyance" based on the "connector" principle does not consume the driving force, a spared space for controlling and adjusting the height of the soil saturated water layer is large enough, and an optimum strategy for controlling and adjusting the height of the soil saturated water layer for supplying water to the crop root system layer by raising the water in the soil capillary pipe still can be adopted in the case of shallow or deep crop root systems, high or low water consumption and the like in different growth periods of the crops when the irrigators are laid under the tractor-ploughing layer. For example, the height of the soil saturated water layer is reduced to avoid the occurrence of accumulation of salt in the surface soil when the water consumption for crop transpiration is not high and the soil water continues to rise to the soil surface to form soil evaporation between plants. For another example, the height of the soil saturated water layer is increased to avoid affecting seedling emergence and the like since the water supply of the surface soil is insufficient at a seedling stage after sowing, so that the crops are always in an optimum (for example, when evaporation exists between the plants, the height of the soil saturated water layer is reduced) or not the optimum but the most reasonable (for example, the height of the soil saturated water layer is increased at the seedling stage after sowing) irrigation state.

In the present disclosure, the water is supplied upwards in an infiltration manner based on the "connector" principle, so that the soil is loose and not hardened. The higher the soil is, the lower the wetting degree is. The evaporation of the upper soil is less, and the growth of weeds can be effectively inhibited. The "lossless conveyance" based on the "connector" principle almost has no water supply resistance, so that the volume of the unsaturated wetting body in the soil formed under action of the soil capillary pipe is maximum. Compared with the other "adaptive irrigation" method-"negative pressure irrigation" which has large water supply resistance and too small soil wetting range, when the same irrigation uniformity is achieved, a distribution density of the irrigators can be reduced, and a line spacing is increased to reduce the investment and achieve ideal effects of large volume of supplied water, sufficient water supply, no deep seepage and the irrigators being optimally deeply buried under the tractor-ploughing layer. The wide wetting range in the soil is further beneficial for uniform distribution of water and fertilizer, which can create greater growth space for the root systems, and reduces salt damage. A non-intermittent continuous irrigation mode of the present disclosure based on the "connector" principle enables the size of the soil wetting body and a water and fertilizer distribution gradient to be relatively stable, and is beneficial for the plant root systems to grow to an optimum soil water and fertilizer position, and gives full play to an optimum physiological regulation function of the plant root systems so that the root system layer cannot be subjected to soil water saturation due to irrigation, sequentially reduces the humidity of the soil from bottom to top. So that the air permeability of the soil is the best and the temperature is risen rapidly. It is not only superior to the intermittent ground water supply irrigation capable of forming a soil water saturation situation on the upper layers of the root systems, but also superior to various positive pressure difference irrigations capable of directly supplying water to partial crop root systems partially forming the soil water saturation situation on the root system layer, and has a crop growth environment, i.e., water and fertilizer gas-heating conditions, better than any one of previous irrigation modes and methods.

BRIEF DESCRIPTION OF THE DRAWINGS

The above and other features, natures and advantages of the present disclosure become apparent with descriptions to drawings and embodiments below, wherein.

DETAILED DESCRIPTION OF THE DISCLOSURE

The present disclosure is further described below with specific embodiments and drawings. More details are illustrated in the following descriptions in order to fully understand the present disclosure. However, the present disclosure can be apparently implemented in many other manners different from those described herein. Those skilled in the art can make similar promotions and deductions according to actual application situations without departing from connotations of the present disclosure. Therefore, a protection scope of the present disclosure should not be limited by contents of the specific embodiments.

Figure 1:
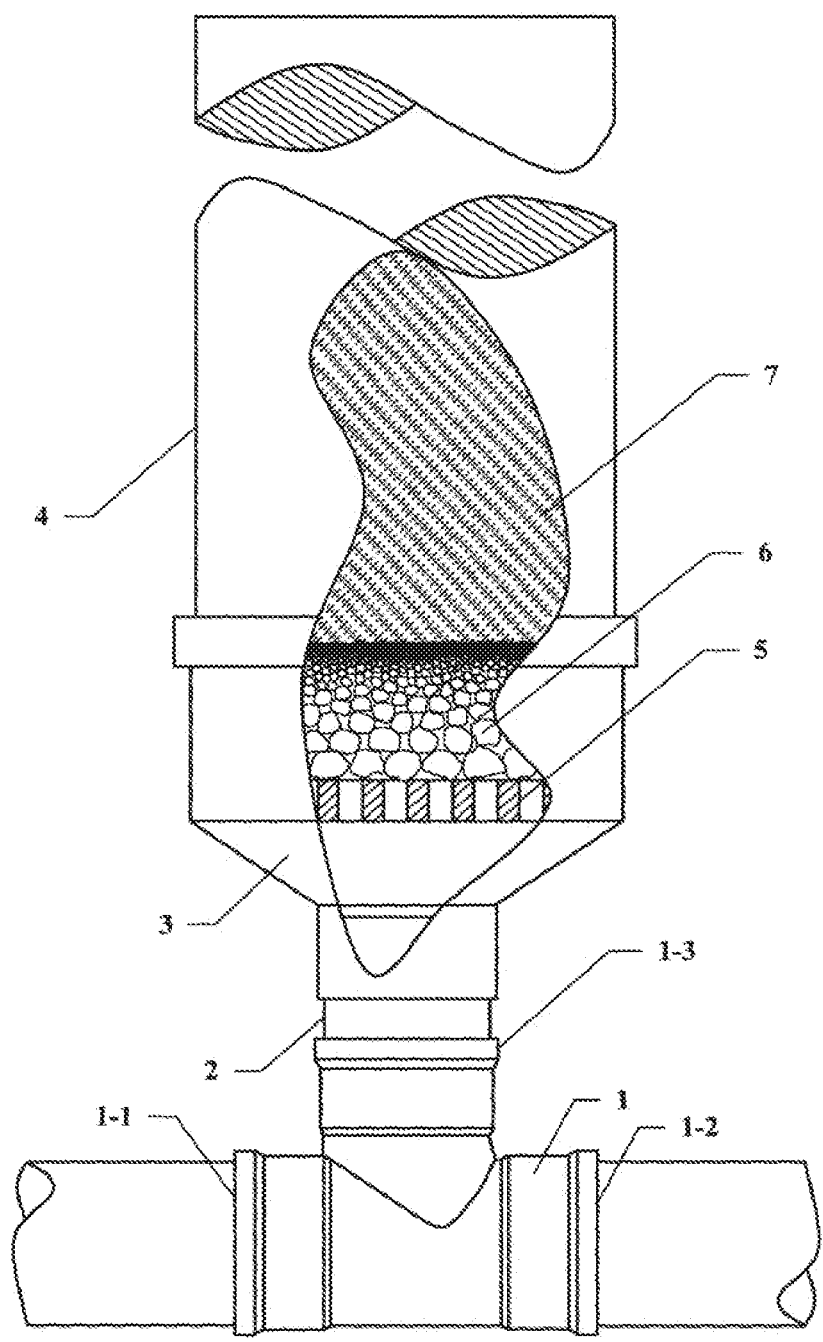
FIG. 1 is a schematic diagram of a novel irrigator of a novel pressureless irrigation device of the present disclosure.
Figure 2:
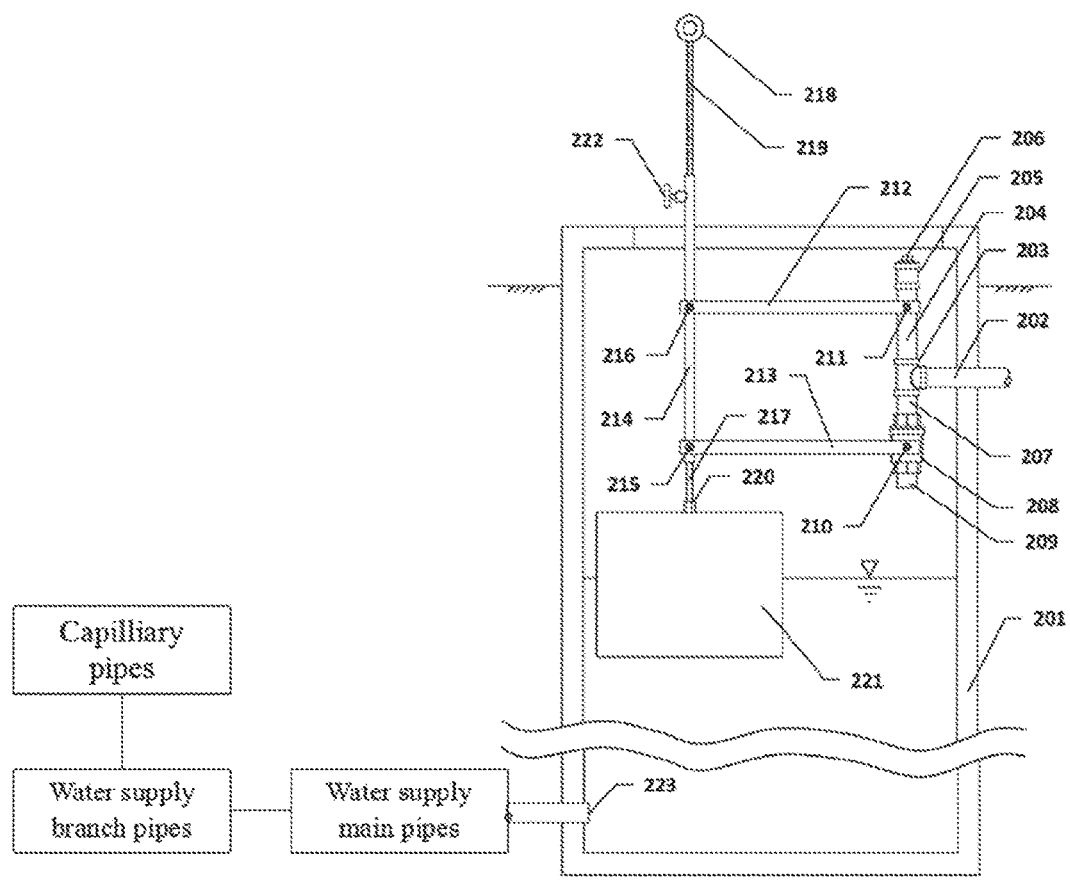
FIG. 2 is a schematic diagram of a water level control pool for water supply of a novel water supply system of a novel pressureless irrigation device of the present disclosure.
Figure 3:
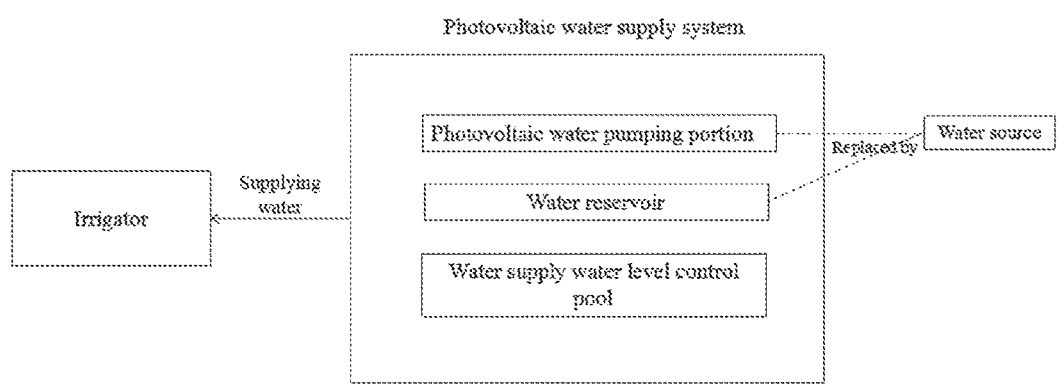
FIG. 3 is a schematic diagram of the photovoltaic water supply system.
Figure 4:
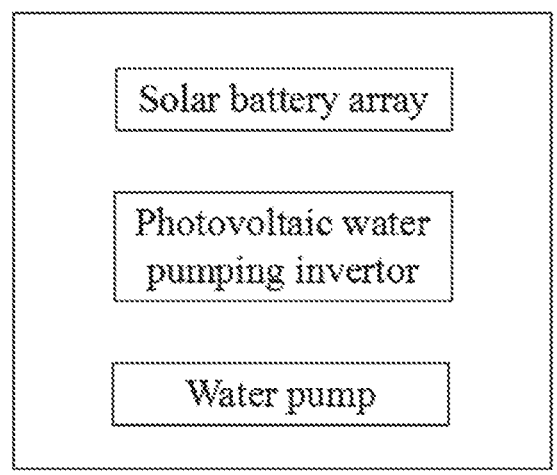
FIG. 4 is a schematic diagram of the photovoltaic water pumping portion

It should be noted that FIG. 1 to FIG. 2 are only taken as examples, and are not drawn at an equal proportion, and should not be used for limiting the protection scope actually demanded by the present disclosure.

The novel pressureless irrigation device includes a novel irrigator and a novel water supply system, which uniformly convey irrigation water to crop plant root systems, wherein the novel irrigator and a water supply water level control pool 201 of the novel water supply system are based on a "connector" principle; and the size of a flow cross-section satisfies very extremely-low flowing speed requirement of "lossless conveyance" for the "connector" in a static pressure dominant operating state.

As shown in FIG. 1, the novel pressureless irrigation device includes a novel irrigator for the novel pressureless irrigation device, wherein the novel irrigator includes an equal-diameter downstream tee joint 1, a horizontal water inlet end 1-1 of the equal-diameter downstream tee joint, a horizontal water outlet end 1-2 of the equal-diameter downstream tee joint, a vertical water inlet end 1-3 of the equal-diameter downstream tee joint, a connecting pipe 2, a reducer pipe 3, a soil saturated water layer forming pipe 4, porous water-permeable plates 5, sandstone inverted filters 6 and backfill soil 7. The equal-diameter downstream tee joint 1 is connected to underground capillary pipes in series. The horizontal water inlet end 1-1 of the equal-diameter downstream tee joint is connected with a head end direction of one capillary pipe. The horizontal water outlet end 1-2 of the equal-diameter downstream tee joint is connected with a rear end direction of the capillary pipe. Head ends of all the capillary pipes are communicated with the water supply water level control pool 201 by water supply branch pipes and water supply main pipes. rear ends of all the capillary pipes are connected with capillary pipe flushing valves by drainage branch pipes and drainage main pipes. The water supply branch pipes, the drainage branch pipes, the drainage main pipes and all the capillary pipes are located on a same horizontal plane. When noncapillary pipes perform flushing operation, the flushing valves are in a closed state. The vertical water inlet end 1-3 of the equal-diameter downstream tee joint is connected with a small head of the reducer pipe 3 by the connecting pipe 2. A lower end of the soil saturated water layer forming pipe 4 is vertically inserted into a large head of the reducer pipe 3. The porous water-permeable plates 5 are placed at the bottom of the soil saturated water layer forming pipe 4 and on one side of the large head of a diameter reducing position of the reducer pipe 3. The sandstone inverted filters 6 are placed on the porous water-permeable plates 5. The backfill soil 7 is placed on the sandstone inverted filters 6. A distance between a top end of the soil saturated water layer forming pipe 4 and a soil surface of a irrigated farmland is 40-45 cm. A height adjustment range of a soil saturated water layer is from the bottom of the backfill soil 7 in the soil saturated water layer forming pipe 4 to the top of the soil saturated water layer forming pipe 4. The height of the soil saturated water layer is adjusted by adjusting a water level of a corresponding water supply water level control pool 201. If the water level control device adopted by the novel pressureless irrigation device disclosed in the patent literature with a publication number of CN102160518A is adopted, only the height of a pipe port of an intake pipe of a water supply tank corresponding to the height of the soil saturated water layer needs to be adjusted. In embodiments of the novel irrigator for the novel pressureless irrigation device, the equal-diameter downstream tee joint 1 is a commercially available equal-diameter downstream tee joint with an external diameter of 50 mm made of a hard PVC material for drainage; the reducer pipe 3 is a commercially available reducer pipe with an external diameter of 50 mm/an external diameter of 100 mm made of the hard PVC material for drainage; and the connecting pipe 2 is a commercially available pipe with an external diameter of 50 mm made of the hard PVC material for drainage.

As shown in FIG. 2, the novel pressureless irrigation device further includes a floating ball water level control device having a control water level adjustment mechanism and a gauge, wherein water inlet pipes 202 of the water supply water level control pool 201 horizontally penetrate through side walls of the water supply water level control pool 201 from right to left and enter the water supply water level control pool 201. Ports connected to an equal-diameter tee 203 face the right. A lower end of an upper connecting pipe 204 is connected with the upper port of the equal-diameter tee 203 above ports perpendicular to an upper port and a lower port of the equal-diameter tee 203. An upper end of the upper connecting pipe 204 is connected with the lower end of a female adapter 205. A square plug 206 is mounted at the upper end of the female adapter 205. The upper end of a lower connecting pipe 207 is connected with the lower port of the equal-diameter tee 203. The lower end of the lower connecting pipe 207 is connected with the upper port of a ball valve 208. The lower port of the ball valve 208 is connected with the upper end of a water distribution pipe 209. The water distribution pipe 209 has a suspended lower end and a downward pipe port. A horizontal head-on surface of a valve rod 210 of the ball valve 208 is inward, and is perpendicular to a plane on which the upper connecting pipe 204, the lower connecting pipe 207 and the water inlet pipes 202 in the water supply water level control pool 201 are located, and is perpendicular to the plane. A right upper shaft 211 is fixed inwards at an upper portion of the upper connecting pipe 204. A right end of the upper connecting rod 212 is sleeved on a right upper shaft 211 after being drilled, and then is equipped with a circular gasket and a gasket fixing plug pin. The upper connecting rod 212 can rotate about the shaft in the plane perpendicular to the shaft The right end of the lower connecting rod 213 is fixed to the valve rod 210. When a left end and a right end of the lower connecting rod 213 are located on the same horizontal plane, the ball valve 208 is in a closed state; when the left end of the lower connecting rod 213 is separated from the horizontal plane and moves downwards, the valve rod 210 can be driven to rotate to open the closed ball valve 208. A left lower shaft 215 is fixed inwards parallel to the valve rod 210 at the lower end of a sleeve 214. The left end of the lower connecting rod 213 is sleeved on the left lower shaft 215 after being drilled and then is equipped with the circular gasket and the gasket fixing plug pin. A left upper shaft 216 is fixed inwards and parallel to the right upper shaft 211 on the sleeve 214 at a position with a distance equal to a distance between the valve rod 210 and the right upper shaft 211 above the left lower shaft 215. The left end of the upper connecting rod 212 is sleeved on the left upper shaft 216 after being drilled and then is equipped with the circular gasket and the gasket fixing plug pin; the distance between the right upper shaft 211 and the left upper shaft 216 is equal to the distance between the valve rod 210 and the left lower shaft 215. A pull ring 218 is fixed at the upper end of a floating box connecting rod 217. Control level gauges 219 are arranged on the upper portion of the floating box connecting rod 217 and the floating box connecting rod 217 below the pull ring 218; the lower end of the floating box connecting rod 217 penetrating through the sleeve 214 is fixed to a floating box 221 by a fixing nut 220 on the floating box 221. Control water level positioning pins 222 are mounted on an upward extended section of the sleeve 214 and on the sleeve 214 at a height higher than an upper cover plate of the water supply water level control pool 201 and convenient to operate above the left upper shaft 216. The upper connecting rod 212 and the lower connecting rod 213 move in the same plane perpendicular to the valve rod 210, the right upper shaft 211, the left lower shaft 215 and the left upper shaft 216. The pipe port of the water outlet pipe 223 of each water supply water level control pool 201 penetrates through the side wall of the water supply water level control pool 201, and is located at the bottom in the water supply water level control pool 201, and is 20-25 cm higher than a bottom surface of the water supply water level control pool 201. The other ends of the water outlet pipes 223 of the water supply water level control pool 201 are connected with the water supply main pipes in the novel irrigator for the novel pressureless irrigation device.

As shown in FIG. 2, the novel pressureless irrigation device further includes a photovoltaic water supply system for the novel irrigator of the novel pressureless irrigation device. The photovoltaic water supply system includes a photovoltaic water pumping portion, a water reservoir and the water supply water level control pool 201. The photovoltaic water pumping portion is composed of a solar battery array, a photovoltaic water pumping invertor and a water pump. The solar battery array is placed on the water reservoir. The water pump is placed at the bottom in a water source well. A water outlet pipe of the water pump is mounted on a water outlet of the water pump. The pipe port at the other end of the water outlet pipe of the water pump is located above the water reservoir and is downward. An overflow pipe is arranged on an upper portion of the water reservoir. A water inlet pipe port of the overflow pipe is formed in a side wall of the water reservoir. The pipe port is located in the water reservoir and is 10-15 cm lower than an upper edge of the side wall of the water reservoir. The other end of the overflow pipe is located outside the water reservoir and has the water outlet pipe port placed in the water source well. One end of the water inlet pipe 202 of each water supply water level control pool 201 is connected with the water reservoir. The pipe port at the end penetrates through the side wall of the water reservoir, and is located in the water reservoir and is 15-20 cm higher than the bottom surface of the water reservoir. The other end of the water inlet pipe 202 of each water supply water level control pool 201 horizontally penetrates through the side wall of the water supply water level control pool 201 from right to left and enters the water supply water level control pool 201. The ports connected to the equal-diameter tee 203 face the right. The lower end of the upper connecting pipe 204 is connected with the upper port of the equal-diameter tee 203 above the ports perpendicular to the upper port and the lower port of the equal-diameter tee 203. The upper end of the upper connecting pipe 204 is connected with the lower end of the female adapter 205. The square plug 206 is mounted at the upper end of the female adapter 205. The upper end of the lower connecting pipe 207 is connected with the lower port of the equal-diameter tee 203. The lower end of the lower connecting pipe 207 is connected with the upper port of the ball valve 208. The lower port of the ball valve 208 is connected with the upper end of the water distribution pipe 209. The water distribution pipe 209 has the suspended lower end and the downward pipe port. The horizontal head-on surface of the valve rod 210 of the ball valve 208 is inward, and is perpendicular to the plane on which the upper connecting pipe 204. The lower connecting pipe 207 and the water inlet pipes 202 in the water supply water level control pool 201 are located, and is perpendicular to the plane. The right upper shaft 211 is fixed inwards at the upper portion of the upper connecting pipe 204. The right end of the upper connecting rod 212 is sleeved on the right upper shaft 211 after being drilled, and then is equipped with the circular gasket and the gasket fixing plug pin; the upper connecting rod 212 can rotate about the shaft in the plane perpendicular to the shaft. The right end of the lower connecting rod 213 is fixed to the valve rod 210. When the left end and the right end of the lower connecting rod 213 are located on the same horizontal plane, the ball valve 208 is in the closed state. When the left end of the lower connecting rod 213 is separated from the horizontal plane and moves downwards, the valve rod 210 can be driven to rotate to open the closed ball valve 208. The left lower shaft 215 is fixed inwards parallel to the head-on surface of the valve rod 210 at the lower end of the sleeve 214. The left end of the lower connecting rod 213 is sleeved on the left lower shaft 215 after being drilled and then is equipped with the circular gasket and the gasket fixing plug pin. The left upper shaft 216 is fixed inwards and parallel to the right upper shaft 211 on the sleeve 214 at a position with a distance equal to a distance between the valve rod 210 and the right upper shaft 211 above the left lower shaft 215. The left end of the upper connecting rod 212 is sleeved on the left upper shaft 216 after being drilled and then is equipped with the circular gasket and the gasket fixing plug pin. The distance between the right upper shaft 211 and the left upper shaft 216 is equal to the distance between the valve rod 210 and the left lower shaft 215. The pull ring 218 is fixed at the upper end of the floating box connecting rod 217. The control level gauges 219 are arranged on the upper portion of the floating box connecting rod 217 and the floating box connecting rod 217 below the pull ring 218. The lower end of the floating box connecting rod 217 penetrating through the sleeve 214 is fixed to the floating box 221 by the fixing nut 220 on the floating box 221. The control water level positioning pins 222 are mounted on the upward extended section of the sleeve 214 and on the sleeve 214 at the height higher than an upper cover plate of the water supply water level control pool 201 and convenient to operate above the left upper shaft 216. The upper connecting rod 212 and the lower connecting rod 213 move in the same plane perpendicular to the valve rod 210, the right upper shaft 211, the left lower shaft 215 and the left upper shaft 216. The pipe port at one end of the water outlet pipe 223 of each water supply water level control pool 201 penetrates through the side wall of the water supply water level control pool 201, and is located in the water supply water level control pool 201, and is 20-25 cm higher than the bottom surface of the water supply water level control pool 201. The other ends of the water outlet pipes 223 of the water supply water level control pool 201 are connected with the water supply main pipes in the novel irrigator for the novel pressureless irrigation device.

Preferably, the distance between the top end of the soil saturated water layer forming pipe 4 and the soil surface of the irrigated farmland is 5-10 cm greater than a maximum tractor-ploughing depth of the irrigated farmland.

Preferably, the height adjustment range of the soil saturated water layer is from the bottom of the backfill soil 7 in the soil saturated water layer forming pipe 4 to the top of the soil saturated water layer forming pipe 4 and is 3-4 cm lower than the upper edge.

Preferably, the height of the soil saturated water layer is controlled and adjusted by controlling and adjusting the water level of the corresponding water supply water level control pool 201 based on the "connector" principle.

Preferably, the porous water-permeable plates 5 are sphere-shaped plates having convex surfaces placed upwards In embodiments of the novel irrigator of the novel pressureless irrigation device constituted by the novel irrigator and the novel water supply system, the equal-diameter downstream tee joint 1 is the commercially available equal-diameter downstream tee joint with an external diameter of 50 mm made of the hard PVC material for drainage; the capillary pipe is the commercially available pipe with an external diameter of 50 mm made of the hard PVC material for drainage. The reducer pipe 3 is the commercially available reducer pipe with an external diameter of 50 mm/an external diameter of 100 mm made of the hard PVC material for drainage. The connecting pipe 2 is a commercially available pipe with an external diameter of 50 mm made of the hard PVC material for drainage. The soil saturated water layer forming pipe 4 is a commercially available pipe with an external diameter of 110 mm made of the hard PVC material for drainage and has a length of 40 cm. The porous water-permeable plate 5 is a 15 mm thick sphere-shaped plate injection-molded by the hard PVC material, and has 6 mm-wide ribs on the plate and 8 mm-wide gaps, and has the convex surface placed upwards.

Although the present disclosure is disclosed above by preferred embodiments, the preferred embodiments are not used to limit the present disclosure. Any one of those skilled in the art can make possible changes and amendments without departing from spirits and scope of the present disclosure. Any amendment, equivalent change and modification made to the above embodiments according to a technical essence of the present disclosure without departing from contents of technical solutions of the present disclosure fall within the protection scope defined by claims of the present disclosure.

What is claimed is:

1. A pressureless irrigation device, comprising:
   an irrigator for the pressureless irrigation device, wherein the irrigator comprises
   an equal-diameter downstream tee joint (1),
   a horizontal water inlet end (1-1) of the equal-diameter downstream tee joint,
   a horizontal water outlet end (1-2) of the equal-diameter downstream tee joint,
   a vertical water inlet end (1-3) of the equal-diameter downstream tee joint,
   a connecting pipe (2),
   a reducer pipe (3),
   a soil saturated water layer forming pipe (4),
   a porous water-permeable plate (5),
   a sandstone inverted filter layer (6) and
   backfill soil (7);
   the equal-diameter downstream tee joint (1) is connected to capillary pipes in series underground;
   the horizontal water inlet end (1-1) of the equal-diameter downstream tee joint is connected with a head end direction of each of the capillary pipes;
   the horizontal water outlet end (1-2) of the equal-diameter downstream tee joint is connected with a rear end direction of each of the capillary pipes;
   head ends of all the capillary pipes are communicated with a water supply water level control pool (201) by water supply branch pipes and water supply main pipes;
   the vertical water inlet end (1-3) of the equal-diameter downstream tee joint is connected with a small head of the reducer pipe (3) by the connecting pipe (2);
   a lower end of the soil saturated water layer forming pipe (4) is vertically inserted into a large head of the reducer pipe (3);
   the porous water-permeable plate (5) is arranged at the bottom of the soil saturated water layer forming pipe (4) and on one side of the large head of a diameter reducing position of the reducer pipe (3);
   the sandstone inverted filter layer (6) is arranged on the porous water-permeable plate (5);

the backfill soil (7) is placed on the sandstone inverted filter layer (6);

a distance between a top end of the soil saturated water layer forming pipe (4) and a soil surface of an irrigated farmland is 40-45 cm;

a height adjustment range of a soil saturated water layer is from the bottom of the backfill soil (7) in the soil saturated water layer forming pipe (4) to a top of the soil saturated water layer forming pipe (4); and a height of the soil saturated water layer is adjusted by adjusting a water level of the water supply water level control pool (201).

2. The pressureless irrigation device according to claim 1, further comprising:

a floating ball water level control device having a water level adjustment control mechanism and a water level control gauge (219), wherein the water level adjustment control mechanism comprises a floating box connecting rod (217) and a floating box (221);

a water inlet pipe (202) of the water supply water level control pool (201) horizontally penetrates through a side wall of the water supply water level control pool (201) from right to left and enters the water supply water level control pool (201);

the water inlet pipe is connected with a port at a right side of an equal-diameter tee (203), and the port is perpendicular to an upper port and a lower port of the equal-diameter tee (203);

a lower end of an upper connecting pipe (204) is connected with the upper port of the equal-diameter tee (203);

an upper end of the upper connecting pipe (204) is connected with the lower end of a female adapter (205);

a square plug (206) is mounted at the upper end of the female adapter (205);

an upper end of a lower connecting pipe (207) is connected with the lower port of the equal-diameter tee (203);

a lower end of the lower connecting pipe (207) is connected with the upper port of a ball valve (208);

the lower port of the ball valve (208) is connected with the upper end of a water distribution pipe (209);

the water distribution pipe (209) has a suspended lower end and a downward pipe port;

a horizontal head-on surface of a valve rod (210) of the ball valve (208) is inward, is perpendicular to a plane on which the upper connecting pipe (204), the lower connecting pipe (207) and the water inlet pipes (202) in the water supply water level control pool (201) are located;

perpendicular to the plane, a right upper shaft (211) is fixed inwards at an upper portion of the upper connecting pipe (204);

a right end of an upper connecting rod (212) is sleeved on the right upper shaft (211) after being drilled;

the upper connecting rod (212) is rotatable about the right upper shaft (211) in the plane perpendicular to the right upper shaft (211);

a right end of a lower connecting rod (213) is fixed to the valve rod (210);

when a left end and a right end of the lower connecting rod (213) are located on a same horizontal plane, the ball valve (208) is in a closed state;

when the left end of the lower connecting rod (213) is separated from the horizontal plane and moves downwards, the valve rod (210) is drivable to rotate to open the closed ball valve (208);

a left lower shaft (215) is fixed inwards to a head-on surface of the valve rod (210) parallel to the valve rod (210) at a lower end of a sleeve (214);

the left end of the lower connecting rod (213) is sleeved on the left lower shaft (215) after being drilled;

a left upper shaft (216) is fixed inwards and parallel to the right upper shaft (211) on the sleeve (214) at a position with a distance equal to a distance between the valve rod (210) and the right upper shaft (211) above the left lower shaft (215);

the left end of the upper connecting rod (212) is sleeved on the left upper shaft (216) after drilled;

a distance between the right upper shaft (211) and the left upper shaft (216) is equal to a distance between the valve rod (210) and the left lower shaft (215);

a pull ring (218) is fixed at a upper end of the floating box connecting rod (217);

the water-level control gauge (219) is arranged on an upper portion of the floating box connecting rod (217) and on the floating box connecting rod (217) below the pull ring (218);

a lower end of the floating box connecting rod (217) penetrating through the sleeve (214) is fixed to the floating box (221) by a fixing nut (220) on the floating box (221);

a control water level positioning pin (222) is mounted on an upward extended section of the sleeve (214) and on the sleeve (214) at a height higher than an upper cover plate of the water supply water level control pool (201) above the left upper shaft (216);

the upper connecting rod (212) and the lower connecting rod (213) move in the same plane perpendicular to the valve rod (210), the right upper shaft (211), the left lower shaft (215) and the left upper shaft (216);

a pipe port at one end of a water outlet pipe (223) of the water supply water level control pool (201) penetrates through the side wall of the water supply water level control pool (201), and the pipe port is located at the bottom of the water supply water level control pool (201) with 20-25 cm higher than a bottom surface of the water supply water level control pool (201); and the other end of the water outlet pipe (223) of the water supply water level control pool (201) is connected with the water supply main pipes in the irrigator of the pressureless irrigation device.

3. The pressureless irrigation device according to claim 1, further comprising:

a photovoltaic water supply system for the irrigator of the pressureless irrigation device;

the photovoltaic water supply system comprises a photovoltaic water pumping portion, a water reservoir and the water supply water level control pool (201);

the photovoltaic water pumping portion is composed of a solar battery array, a photovoltaic water pumping invertor and a water pump;

the solar battery array is configured on the water reservoir;

a water pump water outlet pipe is mounted on a water outlet of the water pump;

a pipe port at the other end of the water pump water outlet pipe is located above the water reservoir and the mouth of the pipe port is downward;

an overflow pipe is arranged on an upper portion of the water reservoir;

a water inlet pipe port of the overflow pipe is configured on a side wall of the water reservoir;

the water inlet pipe port is located in the water reservoir and the water inlet pipe port is 10-15 cm lower than an upper edge of the side wall of the water reservoir;

the other end of the overflow pipe is located outside the water reservoir and has a water outlet pipe port placed in a water source well;

one end of a water inlet pipe (202) of the water supply water level control pool (201) is connected with the water reservoir;

a pipe port at one end of the water inlet pipe (202) connected with the water reservoir penetrates through the side wall of the water reservoir, and the pipe port at one end of the water inlet pipe (202) is located in the water reservoir with 15-20 cm higher than a bottom surface of the water reservoir;

the other end of the water inlet pipe (202) of the water supply water level control pool (201) horizontally penetrates through a side wall of the water supply water level control pool (201) from right to left and enters the water supply water level control pool (201);

the water inlet pipe (202) is connected with a port at right side of the equal-diameter tee (203), and the port is perpendicular to an upper port and a lower port of the equal-diameter tee (203);

a lower end of an upper connecting pipe (204) is connected with the upper port of the equal-diameter tee (203);

an upper end of the upper connecting pipe (204) is connected with a lower end of a female adapter (205);

a square plug (206) is mounted at an upper end of the female adapter (205);

an upper end of a lower connecting pipe (207) is connected with the lower port of the equal-diameter tee (203);

a lower end of the lower connecting pipe (207) is connected with an upper port of a ball valve (208);

a lower port of the ball valve (208) is connected with an upper end of a water distribution pipe (209);

the water distribution pipe (209) has a suspended lower end and a downward pipe port;

a valve rod (210) of the ball valve (208) is facing inwards, and the valve rod (210) is perpendicular to a plane on which the upper connecting pipe (204), the lower connecting pipe (207) and the water inlet pipes (202) in the water supply water level control pool (201) are located;

perpendicular to the plane, an right upper shaft (211) is fixed inwards at an upper portion of the upper connecting pipe (204);

a right end of an upper connecting rod (212) is sleeved on the right upper shaft (211) after being drilled;

the upper connecting rod (212) is rotatable about the right upper shaft (211) in the plane perpendicular to the right upper shaft (211);

a right end of a lower connecting rod (213) is fixed to the valve rod (210);

when a left end and the right end of the lower connecting rod (213) are located on the same horizontal plane, the ball valve (208) is in the closed state;

when the left end of the lower connecting rod (213) is separated from the horizontal plane and moves downwards, the valve rod (210) is drivable to rotate to open the closed ball valve (208);

a left lower shaft (215) is fixed inwards and parallel to the head-on surface of the valve rod (210) at a lower end of a sleeve (214);

the left end of the lower connecting rod (213) is sleeved on the left lower shaft (215) after being drilled;

a left upper shaft (216) is fixed inwards, and parallel to the right upper shaft (211) on the sleeve (214) at a position with a distance equal to a distance between the valve rod (210) and the right upper shaft (211) above the left lower shaft (215);

a left end of the upper connecting rod (212) is sleeved on the left upper shaft (216) after being drilled;

a distance between the right upper shaft (211) and the left upper shaft (216) is equal to a distance between the valve rod (210) and the left lower shaft (215);

a pull ring (218) is fixed at an upper end of a floating box connecting rod (217);

a control level gauge (219) is arranged on the upper portion of the floating box connecting rod (217) below the pull ring (218);

a lower end of the floating box connecting rod (217) penetrating through the sleeve (214) is fixed to a floating box (221) by a fixing nut (220) on the floating box (221);

a control water level positioning pin (222) is mounted on an upward extended section of the sleeve (214) and on the sleeve (214) at the height higher than an upper cover plate of the water supply water level control pool (201) above the left upper shaft (216);

the upper connecting rod (212) and the lower connecting rod (213) move in the same plane perpendicular to the valve rod (210), the right upper shaft (211), the left lower shaft (215) and the left upper shaft (216);

the pipe port at one end of the water outlet pipe (223) of the water supply water level control pool (201) penetrates through the side wall of the water supply water level control pool (201), and the pipe port is located in the water supply water level control pool (201), with 20-25 cm higher than a bottom surface of the water supply water level control pool (201); and the other end of the water outlet pipes (223) of the water supply water level control pool (201) is connected with the water supply main pipe in the irrigator for the pressureless irrigation device.

4. The pressureless irrigation device according to claim 3, wherein the water reservoir and the photovoltaic water pumping portion are replaced by a water source with a minimum dynamic water level higher than a water level of the water supply water level control pool (201); and one end of the water inlet pipe (202) of the water supply water level control pool (201) is connected with the water source.

5. The pressureless irrigation device according to claim 3, wherein the irrigator and the novel water supply system for the irrigator uniformly convey the irrigation water to the crop plant root systems.

6. The pressureless irrigation device according to claim 1, wherein a distance between a top end of the soil saturated water layer forming pipe (4) and a soil surface of the irrigated farmland is 5-10 cm greater than a maximum tractor-ploughing depth of the irrigated farmland.

7. The pressureless irrigation device according to claim 1, wherein a height adjustment range of the soil saturated water layer is from the bottom of the backfill soil (7) in the soil saturated water layer forming pipe (4) to the top of the soil saturated water layer forming pipe (4) and the height is 3-4 cm lower than an upper edge.

8. The pressureless irrigation device according to claim 5, wherein
the height of the soil saturated water layer is controlled and adjusted by controlling and adjusting a water level of the water supply water level control pool (201).

* * * * *